Sept. 22, 1959   J. L. GRATZMULLER   2,905,164
STARTING DEVICE
Filed Jan. 17, 1957   4 Sheets-Sheet 3

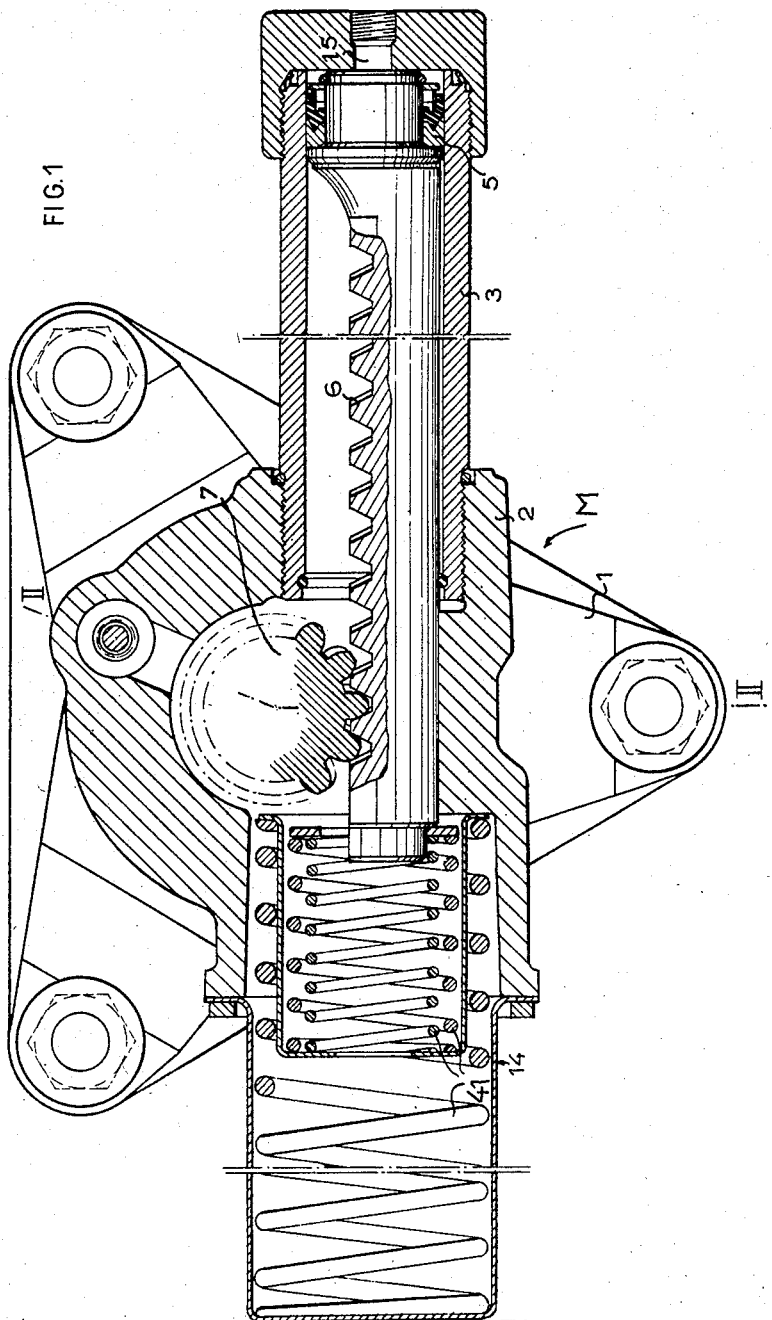

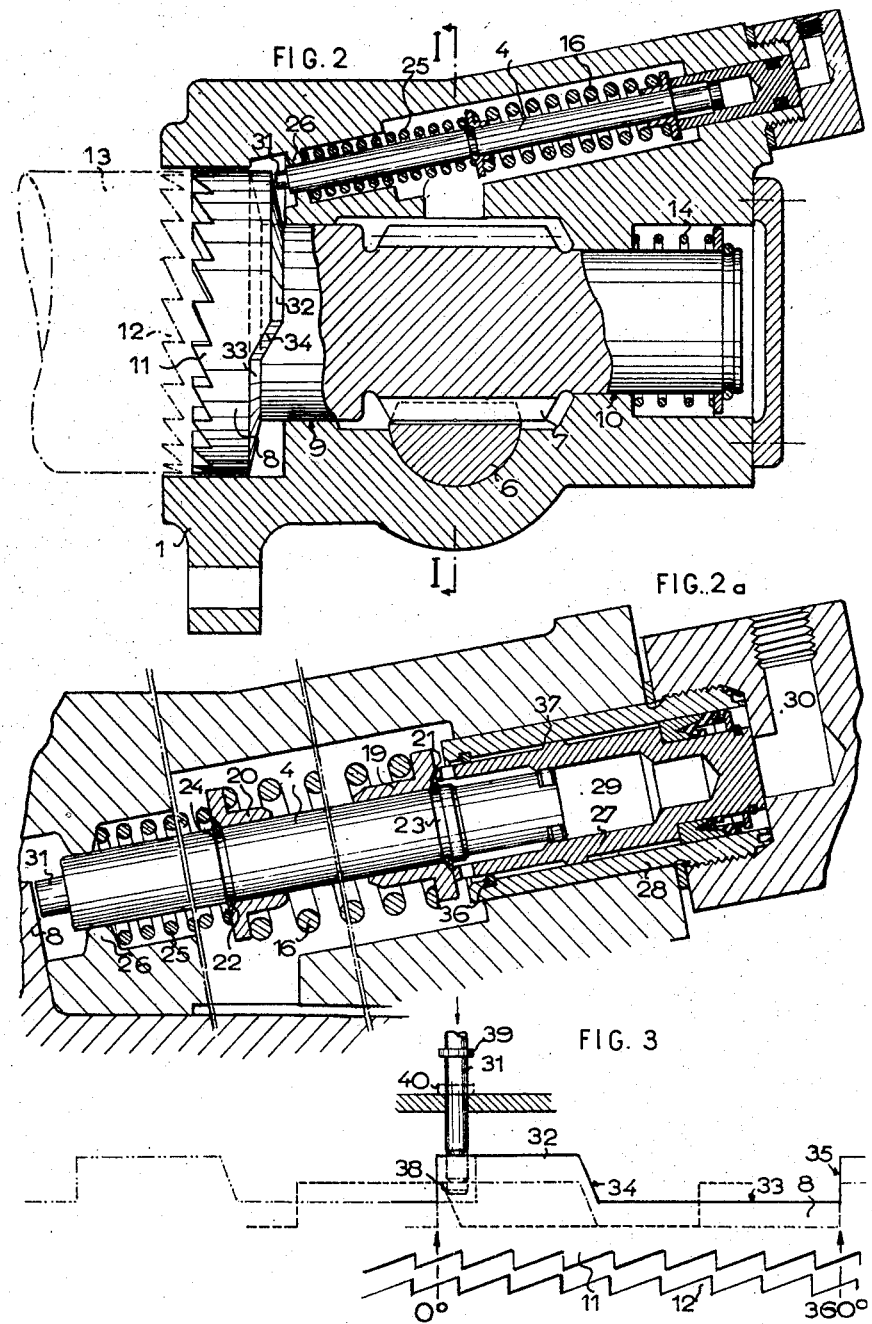

Inventor
J. L. Gratzmuller
By Mason Downing Seebold
Attys.

Sept. 22, 1959 J. L. GRATZMULLER 2,905,164
STARTING DEVICE
Filed Jan. 17, 1957 4 Sheets-Sheet 4

Inventor
J. Gratzmuller

United States Patent Office 2,905,164
Patented Sept. 22, 1959

2,905,164

STARTING DEVICE

Jean Louis Gratzmuller, Paris, France

Application January 17, 1957, Serial No. 634,730

Claims priority, application France January 27, 1956

13 Claims. (Cl. 123—179)

This invention relates to a control device capable of ensuring successively and in a suitable order the various steps of a starting operation, of the type in which a dog-toothed coupling driving member is temporarily engaged with a dog-toothed coupling driven member to cause displacement of the same by a well-defined stroke, under given speed conditions, correspondingly to the required starting operation. The operation of such a starting device comprises two main steps, viz.: interengagement of the dog-toothed members and starting proper.

The invention more particularly relates to a starting device of the type described wherein the second step is ensured by a hydraulic jack and the illustrative description given hereunder will be described for simplifying purposes with reference to a particular case in which the drive connection between the piston of said jack and the driving member is ensured by a rack directly fast with said piston and continuously meshing with a pinion rotationally fast with the said driving member, the assembly comprising said pinion and driving member being adapted to undergo a limited axial shift without bringing said pinion out-of-gear with said rack, the said axial shift corresponding to the clutching and declutching stroke of the driving member with respect to the driven one.

It is, however, to be clearly understood that the invention is in no way limited to this particular arrangement nor otherwise than defined in the appended claims.

In the known starting devices of this type, the interengagement between both dog-toothed members is ensured by a continuous helical motion, usually with a constant pitch of the pinion-cum-driving member assembly between its resting position and its position corresponding to full interpenetration of the dog-teeth.

Now, the said helical motion has necessarily its axial component equal to the thickness of the teeth added with the distance between the apices of the teeth in the resting position, which distance must be sufficient to avoid any unwanted contact between said teeth. Moreover, the angular displacement of the driving member required for ensuring in all cases the full interpenetration of the teeth is necessarily at least equal to the angular distance between two consecutive teeth since the driven member lies, before starting, in an absolute undefined angular position and since the device should be designed in such a way that it operates correctly even in the most unfavorable case, i.e., in the case when the teeth are angularly shifted at rest by the whole angular gap between two consecutive teeth.

Finally, since the helical motion which, during the active operation of the interengagement step thus requires an angular displacement component of minimum predetermined value, is a continuous motion, the said active step is necessarily preceded during the approach step by a considerable additional angular displacement of the driving member, which displacement is absolutely without any interest.

An object of the invention is to provide a starting device of the type described, wherein the interengagement of the toothed members is effected in two successive steps, viz.: an approach step consisting in an axial displacement practically without any angular shift and a step of interengagement proper which is the only one to require a helical motion.

This arrangement offers the essential advantage of practically limiting the angular displacement of the driving member during the whole interengagement process to the angular gap between two consecutive teeth of said member.

Another object of the invention is to ensure the axial displacement of the assembly comprising the pinion and the driving member by means of a pusher actuated through means capable of limiting the effort applied to said driving member and which, once the dog-teeth of both members are in mutual contact, continues to exert on the driving member a predetermined pressure whatever may have been the prior relative angular positions of said members.

Owing to this feature, the helical motion ensuring the interengagement proper may be obtained by merely rotating the driving member, since the pusher-pressure then progressively drives the teeth of the driving member between those of the driven member by a cam-following effect. Furthermore, since no positive interconnection is provided between the means provided for rotating the driving member and the advance motion of the latter under the elastic action of the pusher, no abnormal effort can be generated.

Now, in the known devices, the value of the angular displacement required for ensuring full interpenetration of the toothings is not well-defined, so that it may prove unsufficient, the starting then beginning before completion of said interpenetration, which causes between the teeth, an objectionable shock.

This is due to the fact that in said known devices the said angular displacement is proportional to the axial stroke which, in turn, depends on the clearance between the apices of the teeth at rest; the said clearance varies, for example, in the case of an internal combustion engine starter, with the relative position of the same with respect to the engine to be started, since the starter is usually a removable unit adapted on the engine, while the crankshaft undergoes important axial shifts as the engine is running. Experience shows that a considerable clearance between the toothings in the resting position of the starter is indispensable.

With the device according to the invention, the maximum angular displacement rigorously corresponds to the angular gap between two successive tooth apices.

Another object of the invention is to ensure the axial displacement of the effort limiting pusher by means of an axial hydraulic jack independent of the main starting jack but fed with pressure fluid from the same source as the latter.

Still another object of the invention is to associate the abovementioned pusher, on the one hand, with a continuously acting return spring and, on the other hand, with a suitable control device acting through an effort-limiting spring, the arrangement being such that the last-mentioned spring be capable of overcoming the action of the return spring at least after a certain stroke of the said device.

A further object of the invention is to associate the effort-limiting spring with a device giving it a pretension so that it begins to act on the pusher as soon as the control device is actuated, an abutment being furthermore provided to limit the active stroke of the control device and hence, that of the pusher.

Now, it is advantageous to provide facilities for ensuring immediate releasing of the driving member as the starting operation is completed, so as to avoid a ratcheting effect liable to cause a disagreeable noise and objectionable wear of the dog-teeth.

It is a further object of the invention to suppress any possibility of action of the pusher after a predetermined angular displacement of the driving member at least equal to the angular interengagement stroke and, anyway, smaller than the starting stroke.

Still another object of the invention is to provide on the driving member a cam-profile so designed that the pusher be capable of acting on said driving member only within the above-defined predetermined angular stroke.

Another object of the invention is to design the control pusher and the feeding of the starting hydraulic jack in such a manner that the actuation of the pusher be ensured before pressure fluid begins to be admitted into the starting jack.

For this purpose, in the case when the pusher is actuated by means of an auxiliary jack, as above indicated, means are furthermore provided to prevent feeding of the main starting jack from beginning, as long as the auxiliary jack has not been completely fed.

It is still a further object of the invention to ensure the angular component of the helical motion effected during the interengagement step by the driving member, by means of the starting jack itself, fed to this effect at a rate far lower than the starting rate, so that the interpenetration of the teeth takes place at a low speed, which minimizes the shock at the end of this operation.

The use of a two-step valve according to a prior patent application of the applicant for obtaining such a two-rate operation of the starting engine, will be described hereunder.

Preferred embodiments of the invention will be hereinafter described with reference to the accompanying drawings, given merely by way of example, and in which:

Figure 1 is an elevation of a hydraulic starting device, partially sectioned along the line I—I of Figure 2, omitting certain parts;

Figure 2 is a section along the line II—II of Figure 1, with some parts shown partly in elevation;

Figure 2a shows part of Figure 2 on an enlarged scale;

Figure 3 is a detail view showing the toothed coupling members "developed" and the "pusher" in three successive positions;

Figure 5:
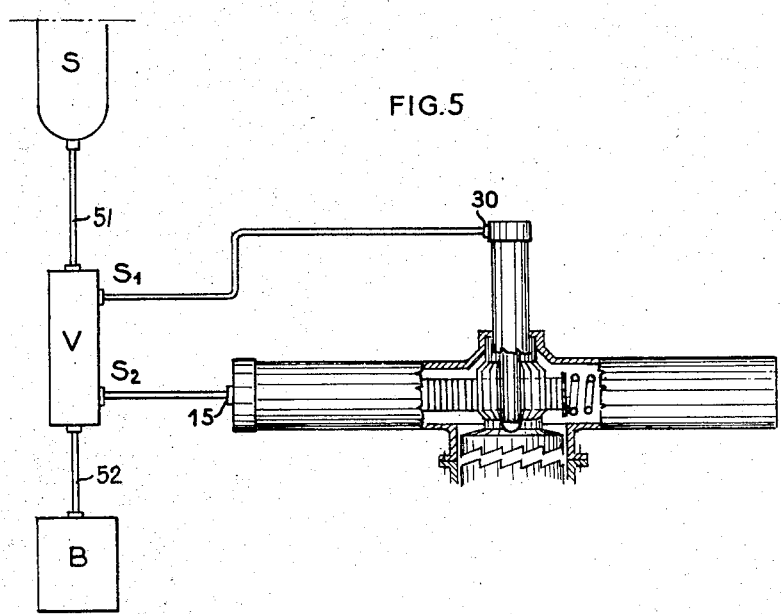
Figure 5 is a schematic general arrangement view illustrating the feed and return system of the starting control device.

The general structure of the starting control device hereafter called a starter motor M is illustrated in Fig. 1. It comprises a one-piece body consisting of two portions designated 1 and 2, a main hydraulic jack 3 mounted on portion 2 of the body and constituting the power element of the starter motor, and a "pusher" 4 (see Figure 2) mounted in body-portion 1. The main jack 3 has a ram 5 subjected to the action of return springs 41 and having formed thereon a toothed rack 6 which engages a pinion 7 rotationally fast on a driving coupling member 8 (Figure 2). As illustrated, the pinion 7, its shaft and the coupling member 8 are in one piece. The shaft portions of the pinion 7 and coupling member 8 are supported by the body in bearings 9 and 10, in which the pinion-cum-coupling member 7, 8 can slide axially between a disengaged position as shown in Figure 2 and a position in which the dog teeth 11 of coupling member 8 fully engage the dog teeth 12 of a driven coupling member 13 forming part of the mechanism such as an internal combustion engine which is to undergo the starting operation. The coupling member-cum-pinion 7, 8 is biased to disengaged position by a weak spring 14, which may, however, be omitted owing to the self-disengaging properties of the dog teeth 11 and 12. Moreover, in the form illustrated (see Figure 1) the teeth of the rack 6 and pinion 7 are slightly skewed so that, when the ram 5 is subjected to hydraulic pressure through a port 15, the tooth pressure has a small component tending to engage the driving coupling member 8 with the driven coupling member 9.

The "pusher" 4 (Figures 2, 2a) which is in the form of a rod is acted on by two compression springs 16, 25. Spring 16 is trapped between two collars 19, 20 slidable on the pusher rod 4, but normally abutting on circlips 21, 22 engaged in grooves 23, 24 formed in the rod and so positioned thereon that spring 16 is pre-loaded. Spring 25, which is weaker than spring 16, is trapped between collar 20 and an abutment 26 formed integrally in the body and serving as a guide in which rod 4 can slide. Since springs 16 and 25 act against opposite sides of collar 20, it follows that if collar 19 is caused to slide along the rod 4 away from its abutment circlip 21 towards collar 20, an effort in the same direction is applied to the rod 4 through the abutment circlip 22, such effort being equal to the difference between the efforts exerted by springs 16 and 25 of which the former is greater; whereas, as long as the collars 19, 20 abut on the circlips 21, 22 respectively, the rod 4 is subjected only to the effort of spring 25.

The pusher rod 4 is operated by the piston 27 of an auxiliary hydraulic jack, whose cylinder 28 has a feed-and-return port 30. The piston 27, which is bored out at 29 to provide a sliding guide for the tail of the rod 4, acts on the collar 19 in the direction to compress spring 16. In the position illustrated in Figure 2a in which the piston 27 is hard against the base of cylinder 28, the spring 25 is pre-loaded by the collar 20 and abutment 26. The power stroke of the piston, and hence the stroke of the pusher rod 4, is limited by engagement between a circumferential rib 37, formed on the outside of the piston, and a circlip 36 lodged in a groove formed in the cylinder 28.

The left-hand end (as seen in Figures 2 and 2a) of the pusher rod 4 terminates in a portion 31 of reduced diameter adapted to engage the rear face of the coupling member 8, which is of cam-like form (see Figure 3) having a high part 32, a sloping ramp 34 and a low part 33 which terminates at a shoulder 35 (preferably rectangular) against the high part. The circumferential length of the high part 32 is at least equal to the smallest fraction of a revolution that must be imparted to the driven coupling member 13 to ensure starting of the engine of which it is a part, but is preferably less than that of the low part 33.

The developed view in Figure 3 shows the cams 32, 33, 34 and the pusher 31 in four successive positions, viz. (i) the initial position (full lines), (ii) first engagement of coupling members (chain-dotted lines), (iii) cessation of pusher action (plain dotted lines) and (iv) final position (double-dot chain-dotted lines). In the initial position (i) the pusher 31 is retracted and opposite the beginning of the high part 32 of the cam; in the second position (ii) the pusher 31 has advanced, pushing the high part 32 of the cam in front of it and the driving and driven coupling members are fully engaged; in the third position (iii) the coupling members have rotated through part of a revolution bringing the pusher opposite the ramp 34. It will be seen that the pusher has advanced somewhat further than when it was in contact with the high part of the cam, indicating that pressure is maintained by the pusher on the cam until the position (iii) is reached. In the final position (iv) the pusher is still fully extended and close to the shoulder 35, the coupling members having completed rather less than a full revolution corresponding to the full stroke of the main jack. Limitation of the stroke of the pusher 31 is illustrated in a purely fictitious way in Figure 3 as by a collar 39 which meets a fixed abutment as shown in dotted lines at 40, the stroke limitation ensuring that as soon as the ramp 34 has cleared the pusher 31 the latter does not reach the low part 33 of the cam. Actually, of course, the stroke of the pusher 31 is limited by the rib 37 and circlip 36 (Figure 2a).

Figure 6:
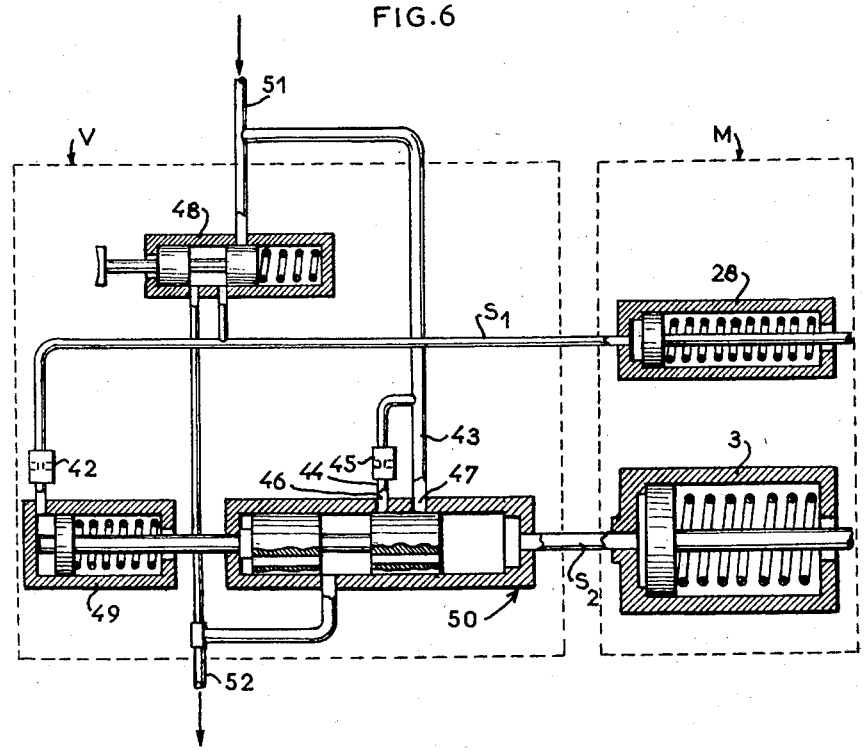
Figure 6 is a schematic illustration of the control valve means.

The hydraulic circuit is schematically illustrated in Figure 5. It comprises a source of the hydraulic pressure S, a sump B at low (usually atmospheric) pressure, valve means V and feed-and-return lines $S_1$, $S_2$ connecting the valve means respectively to the auxiliary jack port 30 and the main jack port 15. Figure 6 illustrates in a very schematic way one possible form of the valve means V, the structural details of which are preferably such as are fully described and illustrated in my application for United States patent filed in January 1957 and entitled "Valve System Timing Device."

It is, however, to be understood that for the purposes of the present invention any valve means capable of being operated to bring about the required sequence of actions in the starter-motor as hereinafter described may be used.

Referring to Figure 6, the control valve assembly V (cf. Figure 5) comprises a manually operable pilot valve 48, a controlling hydraulic jack 49 with spring return and a two-stage valve 50. The pilot valve 48 is connected to the main feed line 51 from the source S (Figure 5), to the exhaust line 52 leading to the sump B (Figure 5), to the auxiliary jack 27 of the starter motor M and to the control jack 49, the last mentioned connection including a calibrated orifice 42. The two-stage valve 50 is actuated by the control jack 49 and has connections $S_2$ to the main jack 3 of the starter motor M, the exhaust line 52 and to the main feed line 51, the last-mentioned connection having two branches 43, 44 of which branch 43 is direct and of large capacity and branch 44 includes a calibrated orifice 45, which acts as a flow restrictor.

In the rest position, as shown in Figure 6 the pilot valve 48 connects the auxiliary jack 28 and the control jack 49 to the exhaust line 52; and the two-stage valve 50 connects the main jack 3 to the exhaust line 52. When the pilot valve 48 is actuated (by moving its piston to the right as seen in the figure) it closes the exhaust connection and connects the main feed line 51 to the auxiliary jack 28 thus energizing the latter, and also connects the main feed line 51 through the calibrated orifice 42 to the control jack 49. The latter is thereby energised to move the piston of the two-stage valve 50 to the right and immediately close the exhaust connection of the main jack 3 and by uncovering a port 46 put the latter into communication with the main feed line 51 through the branch line 44 containing the calibrated orifice 45. When the control jack piston has moved through a definite distance the piston of the two-stage valve 50 uncovers a port 47 connected to the second, large capacity, branch 43 of the feed line. Owing to the simultaneous feeding, in the first stage, under the same pressure and through calibrated orifices, of the control jack 49 and the main jack 3, the quantities of liquid admitted into these jacks respectively are always in the same proportion, irrespective of the feed and exhaust pressures and of the speed of response of the control jack 49 (which depends on these pressures); and, since the quantity of liquid admitted into the control jack 49 in the first stage of the operation is constant, being determined by the travel of the control jack piston in the first stage of operation, i.e., the distance between the first and second admission ports 46, 47 of the two-stage valve 50, the quantity of liquid admitted into the main jack 3, and hence the travel of its piston, in the first stage of the operation is likewise constant in all circumstances.

The consequential operation of the starter-motor is as follows:

Initially the main and auxiliary jacks 3 and 28 are exhausted and their pistons 5, 27 respectively are held against the heads of their respective cylinders 3, 28 by their return spring means 25 and 41 (see Figures 1, 2, 2a).

Manual actuation of the pilot valve 48 to the right (Fig. 6) as above described initiates the first phase of the starter-motor operation, in which the auxiliary jack 28 (Figures 2, 2a) is energised to displace the pusher rod 4 and thereby press the driving coupling member 8 into initial engagement with the drivable coupling member 9 (Figures 1, 2 and 3).

Figure 4:
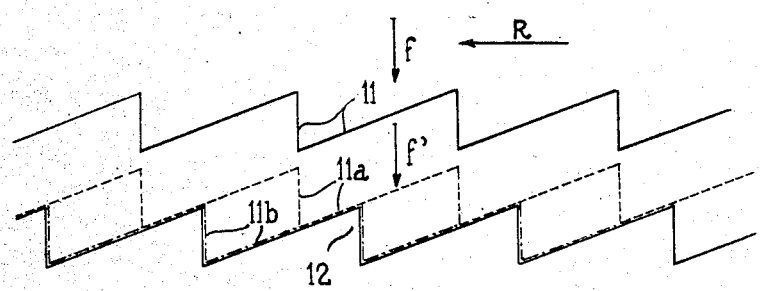
Figure 4 is a "developed" schematic view of the coupling members illustrating their operative principle.

Concurrently, the action of the pilot valve 48 by disconnecting the control jack 49 (Figure 6) from the exhaust line 52 and admitting liquid to it through the calibrated orifice 42, initiates the second phase of the operation of the starter motor M, which begins as soon as the two-stage valve 50 actuated by the control jack 49, after closing the exhaust connection of the main jack 3 of the starter motor, has uncovered the port 46 connected with the feed branch 44 containing the calibrated orifice 45 (Figure 6). The second phase ends and the third phase begins when the two-stage valve 50 uncovers port 47 and allows the main jack 3 to be fed at a high flow-rate through the branch line 43. During the second phase a definite quantity of liquid is admitted at a reduced flow-rate into the main jack 3 causing its piston 5 and rack 6 (Figure 1) to be displaced through a definite distance, thus causing the pinion 7 and coupling member 8 (Figures 1 and 2) to be rotated through a definite angle. The volume of liquid admitted to the main jack 3 in the second phase of operation is proportional to the volume swept by the control jack 49 in moving the two-stage valve 50 from port 46 to port 47, the constant of proportionality being dictated by the relative cross-sectional areas of the orifices 42, 45, which are so selected that the angle through which the coupling member 8 is rotated in the second phase of operation is at least as great as the angular spacing of the teeth 11, 12 of the coupling members 8, 13. This ensures that the coupling members always become fully engaged without shock (owing to the reduced flow-rate into the main jack 3) before the third phase of operation starts, since the relative position of the driving coupling teeth 11 relatively to the drivable coupling teeth 12, when the driving and drivable teeth first make contact, has an angular indeterminacy equal to the tooth-spacing—see Figure 4—in which one possible position of the driving teeth before engagement is shown in full lines at 11, their corresponding position on making contact with the drivable teeth 12 (full line) is shown dotted at 11a, and their position when fully engaged is shown chain-dotted at 11b, the direction of rotation being indicated by arrow R and the initial and final efforts applied by the pusher rod 4 to the driving coupling member being indicated by $f$ and $f'$.

In the third phase of operation, which as explained above cannot begin until the coupling members 8, 13 are fully engaged, the main jack 3 is fed through the unrestricted branch line 43 and port 47 at the maximum rate of which the feed lines and two-stage valve 50 are capable thus ensuring a rapid rotation of the drivable coupling member 13.

During the second and third phases of operation the auxiliary jack piston 27 continues to apply an effort, limited by the springs 16, 25 (Figures 2, 2a) to the pusher rod 4 tending to hold the coupling member 8 in engagement with the coupling member 13, until the end 31 of the pusher rod runs off the high part 32 of the cam-like surface of the coupling member 8 on to the inclined ramp 34, after which no engaging effort is exerted on the coupling member 8 by the pusher rod since its end 31 cannot reach the low part 33 of the cam-like surface. This cessation of engaging effort by the pusher-rod 4 will not, however, cause the coupling members 8, 13 to disengage until the drivable member 13 overruns the driving member 8, i.e., until the starting operation is completed, owing to the friction between the driving faces of teeth 11 and the driven faces of teeth 12.

After a successful start, or if starting does not take place, before the main jack 3 has completed its stroke (corresponding to a rotation of the drivable coupling member through slightly less than 360°—see Figure 3) the pilot valve 48 is restored to its initial position thus connecting all three jacks to exhaust and allowing their pistons to be returned to their starting positions by their return springs.

It will be noted that the control jack 49 (Figure 6) exhausts through the calibrated orifice 42 but this imports no disadvantage and is necessary in the arrangement illustrated to avoid by-passing of the orifice 42 when the control jack 49 is being fed.

It is to be understood that the invention is not limited to the manner of carrying it out described and illustrated. It could incorporate numerous modifications within the competence of those skilled in the art, according to the particular applications envisaged, without thereby going beyond the scope of the invention. In particular, the control valve assembly may preferably be constructed in accordance with the description and with Figure 2 of the illustrations contained in my hereinbefore-mentioned prior application, of which the arrangement schematically illustrated in Figure 6 is a much simplified version intended only to illustrate the principle and to present a complete operative structure. On the other hand it will be understood that the control valve assembly might incorporate separate valves for initiating and stopping the several phases of operation, interconnected by mechanical means ensuring the appropriate phasing, and incorporating any appropriate devices for determining the extent or duration of the phases, especially the second phase above described. Similarly also, other means, within the competence of those skilled in the art, than those described may be used for limiting the effort applied to the coupling members in order to bring them into engagement, without departing from the scope of the invention.

What is claimed is:

1. The combination with a starting device for engines comprising a rotatable and axially shiftable driving clutch section for engaging a driven clutch section on the engine shaft to rotate the latter in a direction to start the engine, a first fluid motor for shifting said driving clutch section into clutch engaging position, and a second fluid motor for rotating the driving clutch section in said starting direction, of means for controlling the energization of said first and second fluid motors in proper sequence including a control valve movable in one direction to supply fluid pressure to said first motor and in another direction to release fluid pressure therefrom, a valve mechanism having a movable valve member operable in one position to supply a slow flow of pressure fluid to said second motor and in another position to supply a rapid flow of pressure fluid to said second motor, a fluid pressure responsive valve operating element for moving said valve member from neutral position successively to said one and to said other position, said valve member being operable in said neutral position to release fluid pressure from said second motor, and means controlled by said control valve for supplying fluid pressure to said valve operating element and including a restriction whereby the pressure fluid flowing through said restriction will move said valve operating element so as to bring said movable valve member into said one position thereof only when said first motor has been energized, and into said other position thereof only when said second motor has been supplied with a volume of slow flowing pressure fluid sufficient to cause said second motor to rotate said driving clutch section through a predetermined angle.

2. A starting device for engines comprising, in combination, a rotatable and longitudinally movable starting shaft having a driving dog-clutch section for engaging a similar driven clutch section on the engine shaft to rotate the latter in a direction to start the engine, a first fluid operated motor, means responsive to the movement of said motor for shifting said starting shaft in a clutch engaging direction, means to slightly displace said driving clutch section with respect to said driven clutch section in said starting direction while maintaining pressure contact between said driving and driven clutch sections to thereby ensure complete clutch engagement, a second fluid motor, and means responsive to the movement of said second fluid motor for rotating said starting shaft in said starting direction.

3. A device according to claim 2 wherein the said slight angular displacement of said driving clutch section with respect to said driven clutch member is equal to the angular gap between two consecutive teeth thereof.

4. A hydraulic device for controlling a starting operation of a mechanism having a dog-toothed rotatable coupling member drivable by said device, the latter comprising a rotatable dog-toothed driving coupling member axially movable into and out of engagement with said drivable coupling member, a pinion fast with said driving coupling member, a toothed rack in engagement with said pinion, a main hydraulic jack for actuating said toothed rack, hydraulic means for axially displacing said driving coupling member to engage it with said drivable coupling member, means for limiting the effort applied by said hydraulic means to said driving coupling member when causing it to engage said drivable coupling member and while said coupling members are mutually engaged, and means operative after said main jack has performed a part only of its full stroke to release said driving coupling member from the action of said hydraulic means, thereby enabling disengagement of said coupling members to take place on overrun of said drivable coupling member.

5. A hydraulic device for controlling a starting operation of a mechanism having a dog-toothed rotatable coupling member drivable by said device, the latter comprising a body, a driving coupling member rotatable and axially slidable in said body, a pinion fast with said driving coupling member, a main hydraulic jack incorporated in said body and having an admission-and-exhaust port, a toothed-rack in engagement with said pinion and actuable by said jack to rotate said pinion through less than 360°, said driving coupling member having on its forward face dog teeth engageable with those of the engine's drivable coupling member, and on its rear face a cam-like surface comprising a high part of constant height occupying part of the circumference, an inclined part and a low part of constant height occupying the remainder of the circumference, an auxiliary hydraulic jack having an admission-and-exhaust port, a pusher member actuable by said auxiliary jack and operative on said cam-like surface to push said driving coupling member into engagement with said drivable coupling member, said pusher member being situated opposite the beginning of the high part of the cam-like surface when the main jack is at the beginning of its operative stroke, means limiting the stroke of said pusher member so that the latter cannot reach the low part of said cam-like surface, and means limiting the effort that can be applied to the pusher member by the auxiliary jack.

6. A hydraulic starting device as defined in claim 5, in which the last-named means includes a relatively strong spring through which the effort of the auxiliary jack is transmitted to the pusher member and a relatively weaker spring re-acting on the body and exerting on the pusher member an effort opposed to that of the auxiliary jack.

7. A hydraulic starting device as defined in claim 6, in which both said springs are pre-loaded.

8. A hydraulic starting device as defined in claim 5, in which the auxiliary jack comprises a cylinder and piston and the last-named means includes two collars slidable on the pusher member, the first of said collars being engaged by the auxiliary jack piston, abutments on said pusher member limiting the separation of said collars, a relatively strong spring trapped between said collars and preloaded thereby, means limiting the stroke of the auxiliary jack piston in both directions and a relatively weak spring trapped between an abutment in the body and the face of the second of said collars opposite to that acted on by the said relatively strong spring, thereby preloading said relatively weak spring.

9. A hydraulic starting device as defined in claim 5, including further a weak spring operative on said driving coupling member and tending to displace it axially in the direction to disengage it from the drivable coupling member of the engine.

10. A hydraulic starting device as defined in claim 5, in which the full stroke of the main jack effects an angular travel of said driving coupling member which is less than 360° by an amount just sufficient to prevent the pusher member from fouling the high part of said cam-like surface at the end of said stroke.

11. A hydraulic starting device as defined in claim 5, in which the high part of said cam-like surface occupies a smaller part of the circumference than the low part of said cam-like surface.

12. In combination, a hydraulic starting device as defined in claim 6, a source of hydraulic liquid under pressure, a sump and control valve means comprising a manually operable pilot valve, a two-stage main valve, a main valve-controlling hydraulic jack, an unrestricted connection from said source to said pilot valve, a feed and return connection from said pilot valve to said controlling jack containing a first calibrated orifice, an unrestricted feed and return connection from said pilot valve to the auxiliary jack of said starting device, a restricted feed connection from said source to said two-stage valve containing a second calibrated orifice, an unrestricted feed connection from said source to said two-stage valve, an unrestricted feed-return connection from said two-stage valve to said main jack and unrestricted return connections from said two-stage valve and from said pilot valve to said sump, said controlling jack being operative when not energised to cause said two-stage valve to connect said main jack with said sump and, when said controlling jack is first energised, to connect said main jack with said source through said second calibrated orifice, and being further operative after admission thereinto of a predetermined quantity of liquid to cause said two-stage valve to connect said main jack with said source through said unrestricted, feed connection, and said pile valve being selectively operable to connect either said sump or said source to said auxiliary jack directly and to said controlling jack through said first-named calibrated orifice.

13. The combination as defined in claim 5, said valve means including a two-stage device operative, when said valve means is set to connect said main jack with said source, to admit, in a first stage, a definite quantity of liquid into said main jack at a reduced rate of flow, and, in a second stage, to admit liquid to said main jack at a high rate of flow.

References Cited in the file of this patent

UNITED STATES PATENTS

| | | |
|---|---|---|
| 1,043,399 | Cole | Nov. 5, 1912 |
| 2,150,026 | Criley | Mar. 7, 1939 |
| 2,498,697 | Molyneux et al. | Feb. 28, 1950 |
| 2,533,379 | Knezo | Dec. 19, 1950 |
| 2,796,856 | Gratzmuller | June 25, 1957 |
| 2,802,452 | Hogeman | Aug. 13, 1957 |

FOREIGN PATENTS

| | | |
|---|---|---|
| 661,354 | Germany | June 16, 1938 |